United States Patent
Gustafson et al.

(10) Patent No.: US 6,178,668 B1
(45) Date of Patent: Jan. 30, 2001

(54) APPARATUS AND METHOD FOR CONNECTING AN IMPLEMENT TO A TRACTION VEHICLE

(75) Inventors: Michael W. Gustafson, McIntosh; Timothy K. Radniecki, Oklee, both of MN (US)

(73) Assignee: Erskine Manufacturing Company, Inc., Erskine, MN (US)

(*) Notice: Under 35 U.S.C. 154(b), the term of this patent shall be extended for 0 days.

(21) Appl. No.: 09/240,168

(22) Filed: Jan. 29, 1999

(51) Int. Cl.[7] .................................................. E01H 5/04
(52) U.S. Cl. .................................................. 37/231; 37/238
(58) Field of Search ............................. 37/231, 233, 241, 37/237, 238; 180/53.1, 53.6, 53.62, 53.7, 53.8

(56) References Cited

U.S. PATENT DOCUMENTS

| | | | |
|---|---|---|---|
| 2,426,410 | * 8/1947 | Owen ........................................ | 37/231 |
| 3,371,543 | * 3/1968 | Jackson et al. ........................ | 180/53.7 |
| 3,483,763 | * 12/1969 | Enters .................................... | 180/53.7 |
| 3,688,847 | 9/1972 | Deeter .................................... | 172/804 |
| 3,731,757 | 5/1973 | Bozsik .................................... | 180/6.26 |
| 3,747,437 | 7/1973 | Hauser .................................... | 74/850 |
| 3,758,967 | * 9/1973 | Thompson ............................. | 37/242 |
| 3,808,914 | 5/1974 | Hauser .................................... | 74/850 |
| 3,822,751 | 7/1974 | Waterman ............................. | 172/776 |
| 3,884,019 | * 5/1975 | Gerzanich ............................. | 56/12.7 |
| 3,911,601 | 10/1975 | Maheu .................................... | 37/43 |
| 3,990,532 | 11/1976 | Robinson ............................... | 180/115 |
| 4,208,812 | 6/1980 | Brownly ................................ | 37/41 |
| 4,304,056 | 12/1981 | Watson et al. ........................ | 37/41 |
| 4,341,059 | * 7/1982 | Gerzanich ............................. | 56/15.8 |
| 4,346,928 | 8/1982 | Towsend ................................ | 294/51 |
| 4,354,320 | 10/1982 | Schmidt ................................. | 37/213 |
| 4,470,211 | * 9/1984 | Rossman ............................... | 37/231 |
| 4,487,006 | * 12/1984 | Scag ...................................... | 56/14.7 |
| 4,512,091 | 4/1985 | Leininger et al. .................... | 37/278 |
| 4,577,712 | * 3/1986 | Foote .................................... | 180/53.1 |
| 4,614,048 | 9/1986 | Melby .................................... | 37/280 |
| 4,615,130 | * 10/1986 | Racicot ................................. | 37/231 |
| 4,658,662 | 4/1987 | Rundle .................................. | 74/331 |
| 4,707,936 | 11/1987 | Steinhoff ............................... | 37/264 |
| 4,741,116 | 5/1988 | Engle et al. .......................... | 37/280 |
| 4,756,102 | 7/1988 | Chapman .............................. | 37/270 |
| 4,825,570 | * 5/1989 | Schmid et al. ....................... | 37/231 |
| 4,858,348 | 8/1989 | Lundy ................................... | 37/265 |
| 4,996,783 | * 3/1991 | Fresia .................................... | 37/245 |
| 5,003,518 | 3/1991 | Felder ................................... | 368/5 |
| 5,046,271 | 9/1991 | Daniels ................................. | 37/231 |
| 5,067,263 | 11/1991 | Pelletier ................................ | 37/220 |
| 5,088,215 | 2/1992 | Ciula ..................................... | 37/197 |
| 5,479,730 | 1/1996 | Gogan ................................... | 37/231 |
| 5,509,219 | 4/1996 | Mecca ................................... | 37/231 |

(List continued on next page.)

FOREIGN PATENT DOCUMENTS

3509645 * 9/1986 (DE) .................................... 180/53.1

OTHER PUBLICATIONS

"Power Vee Plow", Cycle Country Accessories Corporation, No Date.
"Quick Silver ATV Lawn Mowers", Cycle Country Accessories Corporation, No Date.

*Primary Examiner*—Thomas B. Will
*Assistant Examiner*—Nathan Mammen
(74) *Attorney, Agent, or Firm*—Schwegman, Lundberg, Woessner & Kluth, P.A.

(57) ABSTRACT

A modular implement apparatus and method of use for securing a snowblower to an all terrain vehicle (ATV) comprises an implement mounted to a first end of the ATV and an engine mounted at a second end. A longitudinal support structure extends between the two ends and supports a drive shaft assembly. The engine provides power to the implement, thus eliminating the need for a PTO shaft. The apparatus is further adapted to permit placement of the apparatus in either a ground-engaging position or a raised, transport position.

25 Claims, 14 Drawing Sheets

U.S. PATENT DOCUMENTS

| | | | |
|---|---|---|---|
| 5,513,868 | 5/1996 | Barr | 280/400 |
| 5,522,162 | 6/1996 | Allison | 37/242 |
| 5,524,368 | 6/1996 | Struck et al. | 37/235 |
| 5,615,745 | 4/1997 | Cross | 172/811 |
| 5,887,634 * | 3/1999 | Theisen | 144/334 |
| 5,967,241 * | 10/1999 | Cross et al. | 37/231 |

* cited by examiner

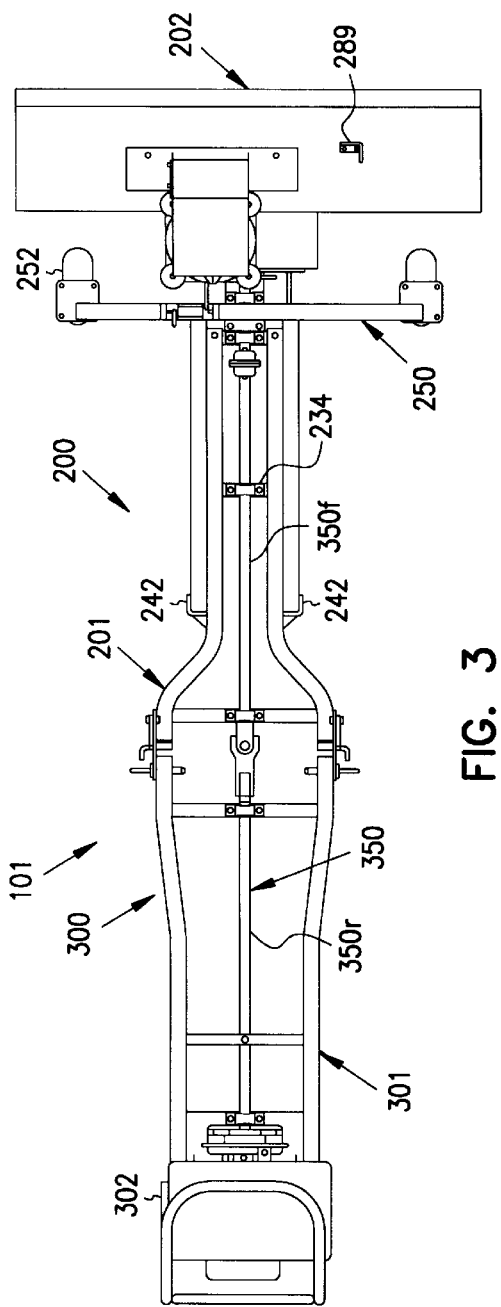
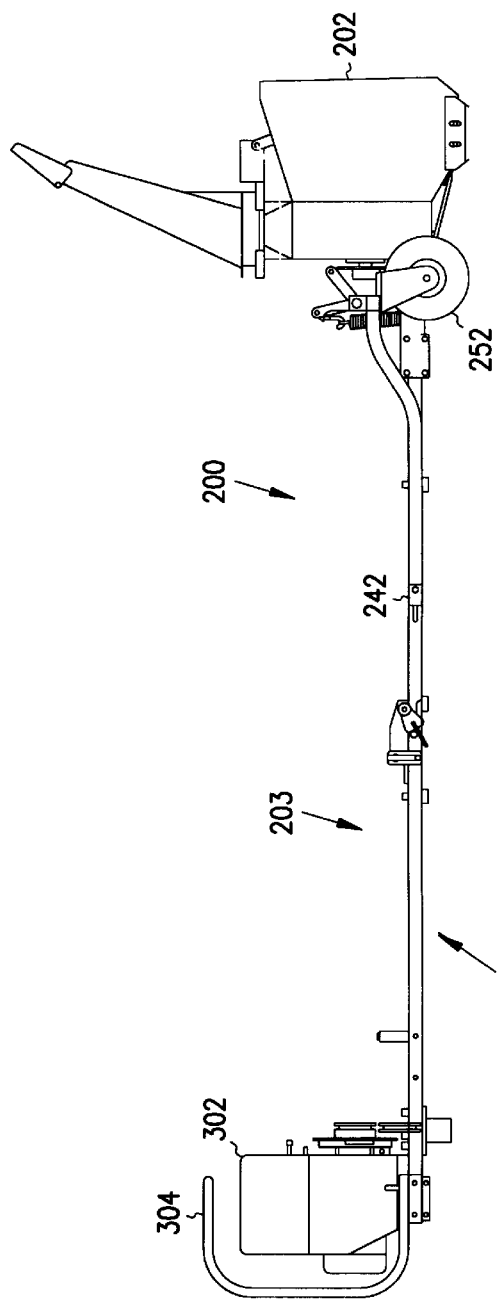
FIG. 3
FIG. 4

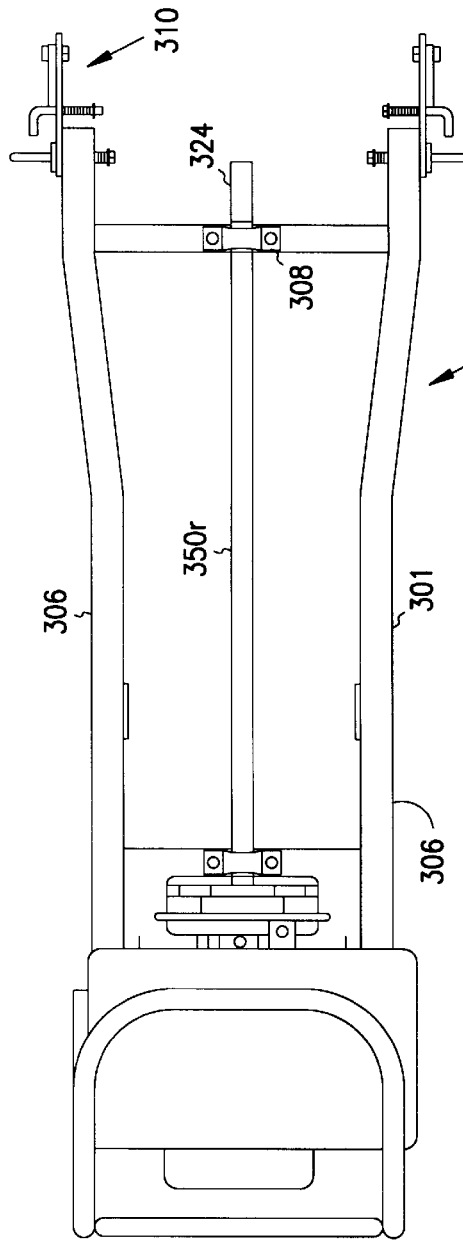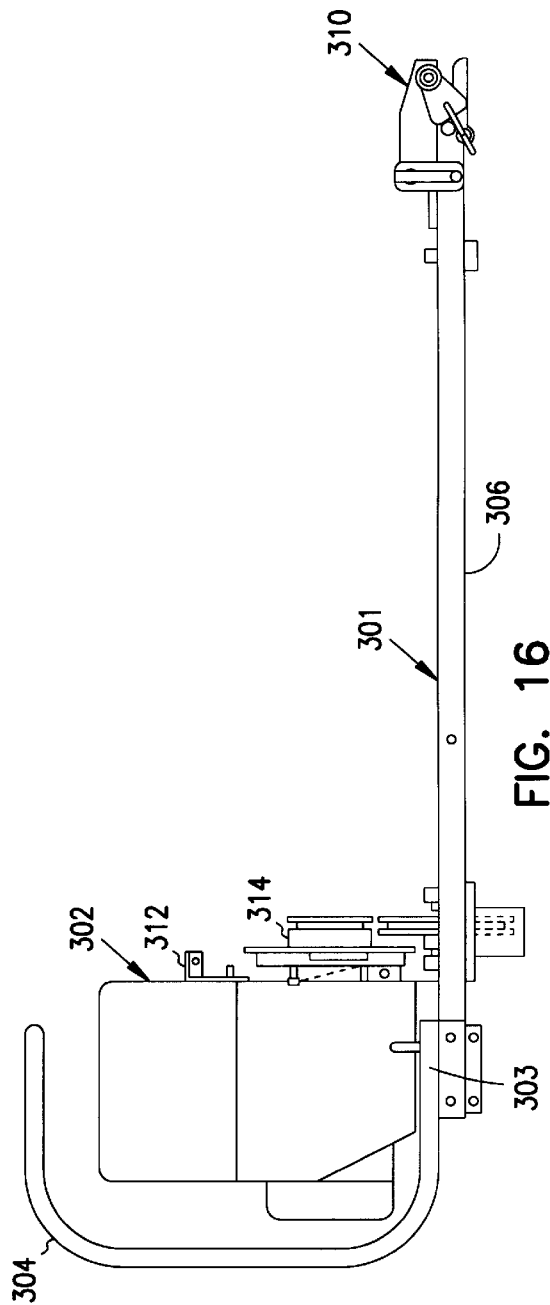

APPARATUS AND METHOD FOR CONNECTING AN IMPLEMENT TO A TRACTION VEHICLE

FILED OF THE INVENTION

The present invention pertains to an improved apparatus and method for connecting an implement to a traction vehicle. More particularly, this invention pertains to an apparatus for connecting a self-powered snowblower to an all-terrain vehicle.

BACKGROUND OF THE INVENTION

All terrain vehicles (ATV) are known in the art. The typical ATV is an all-season vehicle supported by a pair of rear drive wheels coupled through a transmission to a prime mover. A pair of front steerable wheels, which may or may not be driven, support the forward end of the vehicle. ATVs are substantially smaller than road vehicles and are intended specifically for off-road use. While commonly perceived to be dedicated recreational vehicles, ATV manufacturers have also produced models well-suited as general-purpose utility vehicles. Particularly, these utility ATVs have such features as: higher output engines; four wheel drive; more sophisticated transmissions (including reverse gear); and towing capability.

To capitalize on this versatility, equipment manufacturers have introduced various implements and attachments for use with ATVs. For example, U.S. Pat. No. 5,513,868 issued to Barr, discloses a trailer for use with an ATV. Similarly, U.S. Pat. Nos. 5,088,215 issued to Ciula and 5,615,745 issued to Cross, disclose plow blades for use with ATVs. While effective for their intended purpose, these implements are passive, requiring no power other than the driving force of the vehicle to operate.

In contrast to passive implements are power implements. Generally speaking, power implements are considerably more complex in both construction and operation as compared to passive implements. Power implements include such devices as mowers, rotary sweepers, and snowblowers. While the present invention is applicable to many types of power implements and to many different vehicles, for the sake of brevity it will be described herein in terms of an apparatus for attaching a powered, snow removal implement to an ATV.

Unlike the snow plow, the snowblower uses a powered auger to collect snow and an impeller to discharge it outwardly through a directional discharge chute. For many reasons, the snowblower is generally perceived to be a more effective snow removal device than the plow. One reason for this perception is that the snowblower's ability to move snow is not entirely dependent on the driving force of the vehicle. As such, snow moving capacity is not directly limited by the vehicle's speed or power. Additionally, since the snowblower is not "pushing" the snow, the vehicle frame structure is not required to withstand the large reaction loads inherent with snow plowing equipment. Furthermore, snowblowers are advantageous over plows in that they propel the snow outwardly away from the area being cleared instead of piling it up at the perimeter. This improves visibility beyond the cleared area and reduces the amount of subsequent drifting. For these reasons, snowblowers offer advantages over the conventional snow plow.

While advantageous in these respects, snowblowers and other power implements also introduce a unique set of problems not encountered with passive implements (e.g., plows). One such problem concerns the weight of the power implement. To explain, the snowblower is typically mounted slightly forward from the front of the vehicle. During operation, the snowblower is placed in a first ground-engaging position. During transportation, the snowblower is moved to a second, raised position. To support the snowblower in both the ground-engaging and the raised positions, adequate support structure is required. In addition, the geometry of the implement and its support structure must not result in excessive vehicle instability. The latter issue is complicated by the fact that the snowblower is offset from the vehicle, thereby amplifying the adverse effect of its weight by the offset distance. This can result in a "front-heavy" design which reduces both vehicle stability and rear wheel traction. Thus, snowblowers have been generally limited to use win larger vehicles (e.g., trucks, tractors) that are specifically designed to support such heavy implements.

Another problem with attaching a snowblower to an ATV is that the snowblower requires power (in addition to the driving force of the vehicle) to operate the auger and impeller. In truck or tractor-mounted equipment, this power is usually provided by a prime mover located on the vehicle through an auxiliary power take-off or "PTO" shaft specifically designed to power such auxiliary equipment. Unfortunately, ATVs typically do not include a PTO shaft.

One possible solution to this problem is shown in U.S. Pat. No. 5,479,730 issued to Gogan. Gogan discloses a self-powered snowblower for mounting to a pickup. While this design is acceptable for use with a heavy road vehicle, the addition of the motor serves to increase the snowblower weight, contributing to the offset weight problem (i.e., "front-heavy" design) discussed above.

Thus, while it is perceived that an ATV-mounted snowblower would increase the already broad versatility of this popular vehicle, significant problems remain. Particularly, problems resulting from the offset weight of the implement and lack of an available power source are most prevalent. Thus, an attachment apparatus that can accommodate these needs without adversely affecting ATV performance and stability is highly desirable.

SUMMARY OF THE INVENTION

An apparatus and method are described herein for attaching an implement to a traction vehicle. In one embodiment, the apparatus comprises: an implement attached to a first end of a vehicle; an auxiliary engine attached to a second end of the vehicle opposite the first end; and a drive member operatively coupled between the implement and the engine. In another embodiment, the apparatus comprises: a longitudinal frame assembly connected to the traction vehicle, the longitudinal frame assembly having a first portion and a second portion, the first portion extending generally beyond a first end of the vehicle and the second portion extending beyond a second end of the vehicle, the first portion adapted to support the ground-engaging implement. The apparatus further includes means for powering the implement, wherein the powering means is secured to the second portion of the longitudinal frame assembly. A drive shaft assembly operatively connected to the means for powering at an input end and adapted to connect to the implement at an output end may also be included.

A method for connecting an implement to a traction vehicle is also disclosed. In one embodiment, the method comprises: providing a traction vehicle; attaching an engine to a first end of the traction vehicle; attaching an implement to a second end of the traction vehicle; and connecting the engine to the implement with a drive shaft assembly.

In another embodiment, a self-powered apparatus for attachment to a traction vehicle is disclosed wherein the vehicle has an undercarriage structure. The apparatus includes: a ground-engaging implement; an engine frame assembly coupled to the vehicle and extending outwardly from a first end of the vehicle, the engine frame assembly forming an engine mount; an implement frame assembly pivotally connected to the engine frame assembly at a first pivot joint, the implement frame assembly extending outwardly from a second end of the vehicle to support the ground-engaging implement; a caster frame assembly pivotally connected to the implement frame assembly at second pivot joint; an internal combustion engine assembly secured to the engine mount; and a drive shaft assembly operatively connecting the internal combustion engine to the ground-engaging implement.

In still yet another embodiment, a snow removal machine is disclosed. The snow removal machine comprises an all terrain vehicle having a frame; a prime mover supported by the frame; one or more drive wheels coupled to the prime mover; and one or more steerable wheels adapted to steer the vehicle. The machine additionally comprises a self-powered snowblowing apparatus for attachment to the frame. The apparatus may include a snowblowing implement; an engine frame assembly coupled to the vehicle and extending outwardly from a first end of the vehicle wherein the engine frame assembly forms an engine mount; an implement frame assembly pivotally connected to the engine frame assembly at a first pivot joint wherein the implement frame assembly extends outwardly from a second end of the vehicle to support the snowblowing implement; a caster frame assembly pivotally connected to the implement frame assembly at second pivot joint; an internal combustion engine assembly secured to the engine mount; and a drive shaft assembly operatively connecting the internal combustion engine to the snowblowing implement.

Advantageously, the implement apparatus of the present invention provides a self-powered, modular snowblower attachment for use with ATVs and the like. Because the apparatus includes a power source, no power connection to the ATV is necessary. In addition, vehicle stability is minimally impacted due to the placement of the implement one a first side of the vehicle and the placement of the engine on a second, opposing side. Furthermore, the incorporation of a caster frame assembly supports the implement in a raised position without adversely impacting the weight distribution of the vehicle. This allows transportation of the vehicle from one site to another without having to remove the apparatus.

BRIEF DESCRIPTION OF THE DRAWINGS

The invention described herein will be further characterized with reference to the drawings, wherein:

FIG. 3 is top plan view of an implement apparatus in accordance with one embodiment of the invention;

FIG. 4 is a side elevational view of the implement apparatus of FIG. 3;

FIG. 15 is a top plan view of the rear frame assembly in accordance with one embodiment of the present invention;

FIG. 16 is side elevational view of the rear frame assembly of FIG. 15;

DETAILED DESCRIPTION OF THE INVENTION

In the following detailed description of the embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
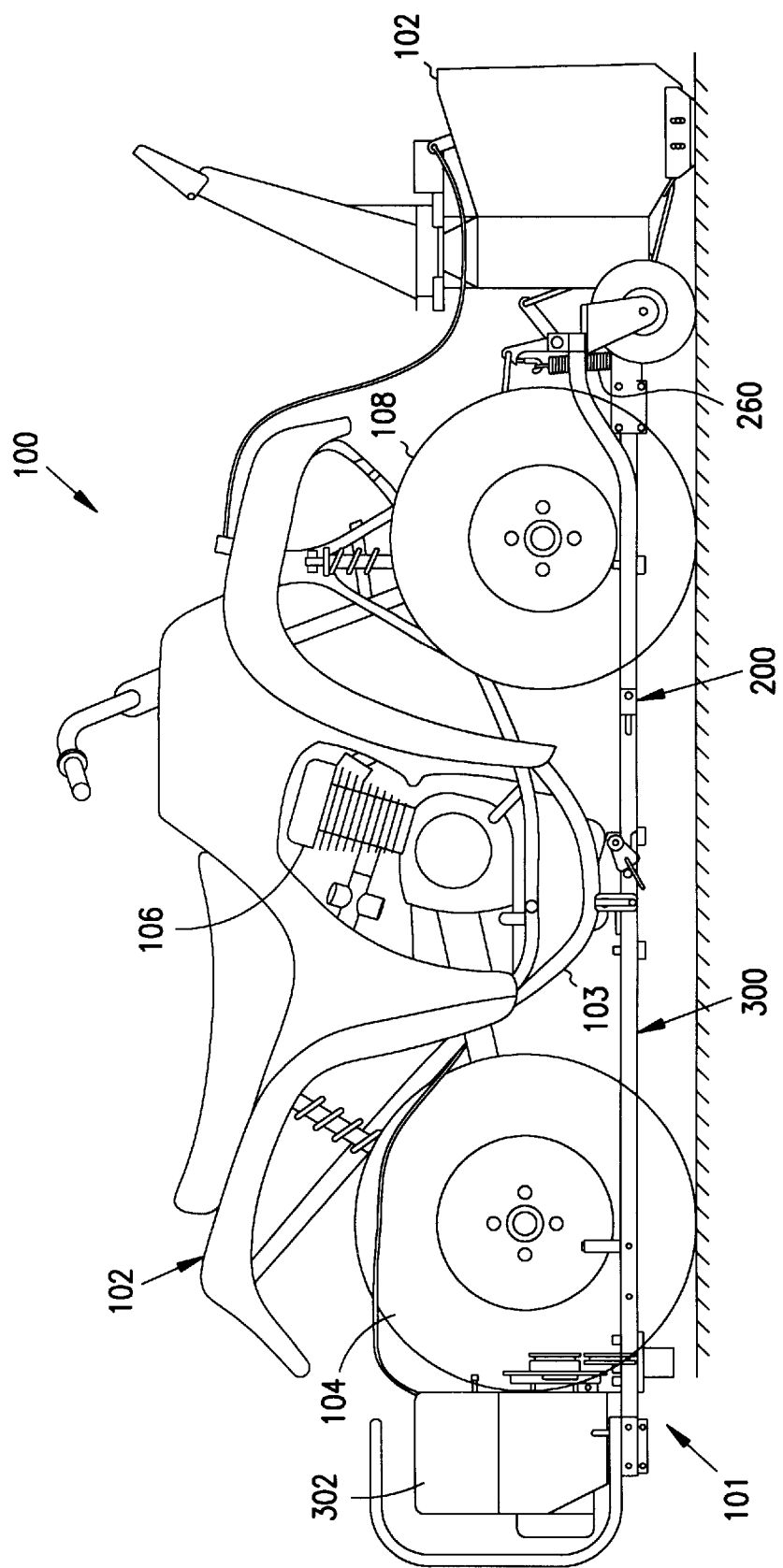
FIG. 1 is a right side elevational view of a snow removal machine in accordance with one embodiment of the invention.

FIG. 1 shows a side view of a first exemplary embodiment of a snow removal machine 100 according to the invention. Machine 100 comprises an implement or snowblowing apparatus 101 connected to a traction vehicle 102. In one embodiment, the vehicle 102 is an all terrain vehicle (ATV) generally of the type represented by the Xplorer 400 sold by Polaris Industries of Plymouth, Minn. The vehicle 102 has an undercarriage structure 103 and is supported by a pair of rear drive wheels 104 coupled through a transmission (not shown) to a prime mover or engine 106. A pair of front steerable wheels 108, which may or may not be driven, support the forward end of the vehicle 102. While described herein with respect to a particular ATV, those skilled in the art will realize that the present invention could be applied to other types of ATV's or, more generally, to other types of vehicles.

Figure 2:
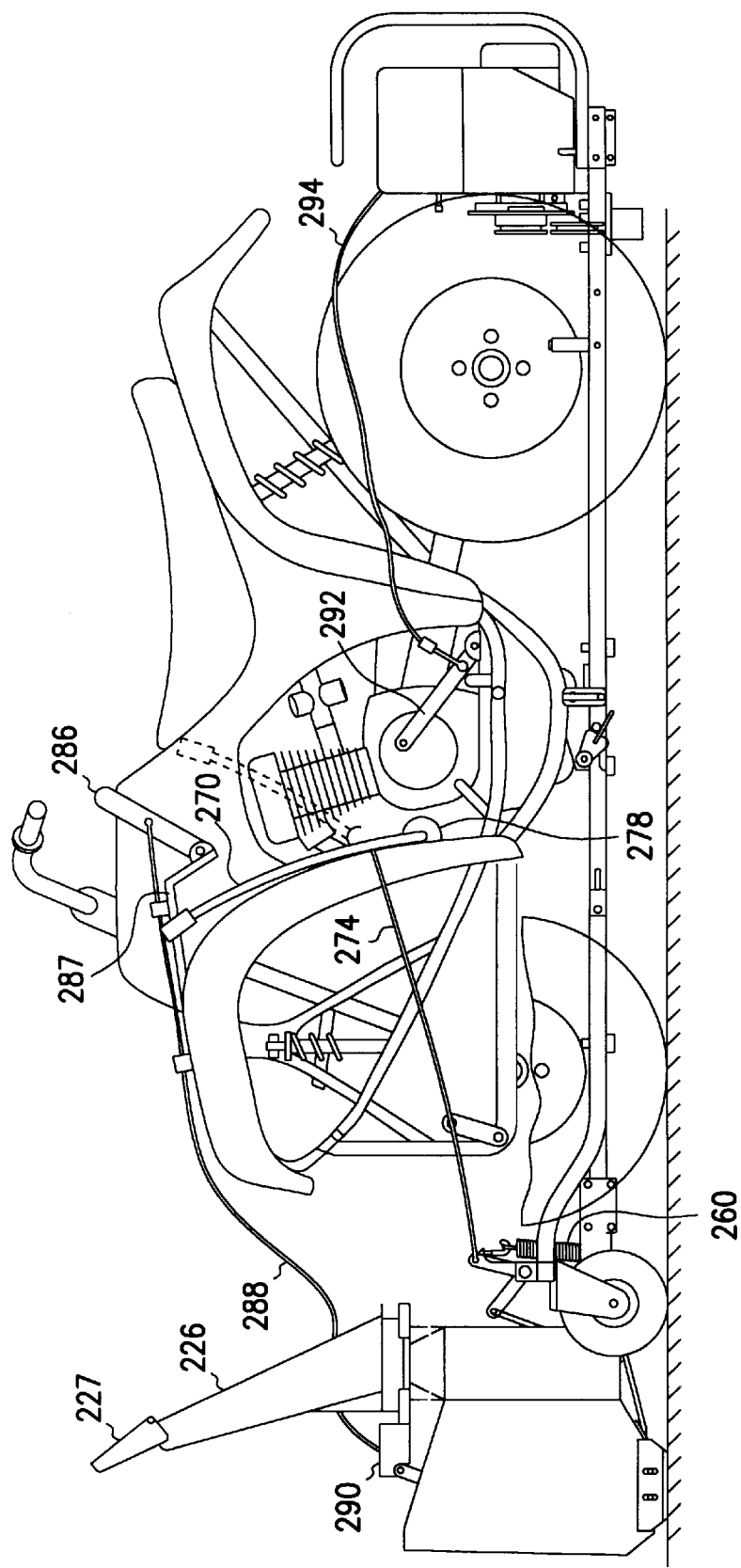
FIG. 2 is a left side elevational view of the snow removal machine of FIG. 1 with a portion cut away.

FIG. 2 shows the same snow removal machine 100 from the opposite side. From this view, various control levers are visible which will be described in more detail below.

Referring now to FIGS. 3–4, the implement apparatus 101, in one embodiment, comprises a front-mounted snowblowing implement 202 and a rear mounted engine 302 coupled by a longitudinal frame assembly 203. The longitudinal frame assembly 203 is comprised of a first portion constituting an implement frame assembly 201 and a caster frame assembly 250. The longitudinal frame 203 further comprises a second portion defining an engine frame assembly 301. To simplify the following discussion, a first or front frame assembly 200 is herein defined which comprises the snowblowing implement or snowblower 202, the implement frame assembly 201, and the caster frame assembly 250. Similarly, a second or rear frame assembly 300 is herein defined comprising the engine frame assembly 301 and the engine 302.

The snowblower 202 is generally of the type represented by the "Power Blower" sold by Erskine Manufacturing Co., Inc., assignee herein, of Erskine Minn. While the implement described herein is a snowblower, those skilled in the art will realize that other ground-engaging implements including but not limited to rotary brushes or sweepers, lawn mowers, and tillers are also possible within the scope of the invention.

Connected to the snowblower 202 is the implement frame assembly 201. The implement frame assembly 201 pivotally couples with the engine frame assembly 301 proximal the midpoint of the vehicle 102 (see FIG. 1). The engine frame assembly 301 is supported by the vehicle undercarriage structure 103 at various attachment points which are further described below. A drive shaft assembly 350, supported by both the implement frame assembly 201 and the engine frame assembly 301, operatively connects the engine 302 to the snowblower 202 to provide driving power to the snowblower. The caster frame assembly 250 is pivotally connected to the implement frame assembly 201 and provides support to the latter. As will be seen, the interrelation of these components yields a self-powered, self-supporting, modular snowblower apparatus 101 for connection to an ATV 102.

Having described the snowblower apparatus generally, attention will now be focused on specific components of the first exemplary embodiment. It is to be understood that the following description is intended to be illustrative, and not restrictive. Many other embodiments will be apparent to those of skill in the art.

Figure 5:
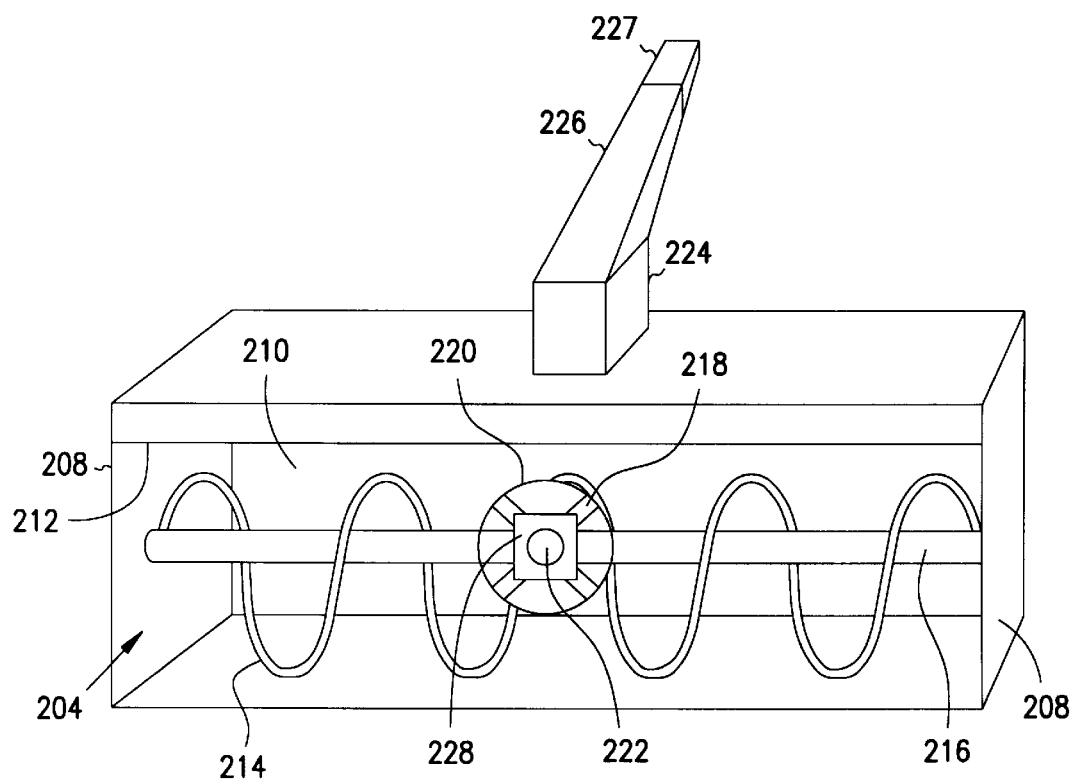
FIG. 5 is a front elevational view of a snowblower in accordance with one embodiment of the present invention.

Although the particular construction of the snowblower 202 is not critical to the invention, its basic components will now be described with reference to FIG. 5. A snow collection cavity 204 is defined by opposing parallel end plates 208, a rear wall 210, and an upper wall 212. Spanning across the cavity 204 between the end plates 208 is an auger 214 which rotates about a horizontal auger shaft 216. The auger 214 is constructed as an opposed, double helix such that, as the auger shaft 216 rotates, the auger 214 draws snow within the cavity 204 toward the cavity center. Centrally located at the center rear of the cavity 204 and in fluid communication therewith is a fan or impeller 218 enclosed within a fan housing 220. The impeller 218 rotates about an impeller shaft 222 which is oriented horizontally but substantially perpendicular to the auger shaft 216. As snow is drawn to the cavity center, it is forced into the fan housing 220 where the rotating impeller 218 discharges the snow through an upper opening 224 in the fan housing 220. The discharging snow can be directed as it exits the fan housing 220 by a discharge chute 226 connected to the upper opening 224. The discharge chute 226 is rotatable about a vertical axis such that snow may be selectably directed to either side or in front of the blower 202. In addition, a directional nozzle 227 at a distal end of the discharge chute 226 provides trajectory control for the discharging snow. By moving the snowblower 202 forward, snow may be continually collected and discharged as described above.

At the center of auger shaft 216 is a transfer case 228. The transfer case receives rotary input from an extension of the impeller shaft 222 and, through a series of gears, translates the rotary shaft 222 motion into transverse rotary auger motion. Thus, a single power input provides rotational power to both the auger 214 and the impeller 218.

To rotate the discharge chute 226, a chute lever 286 as shown in FIG. 2 is included. The chute lever 286 is operatively connected by a push-pull cable 288 to a chute rotator mechanism 290. The chute lever may be secured to the ATV by a bracket 287 a shown in FIG. 2.

Figure 7:
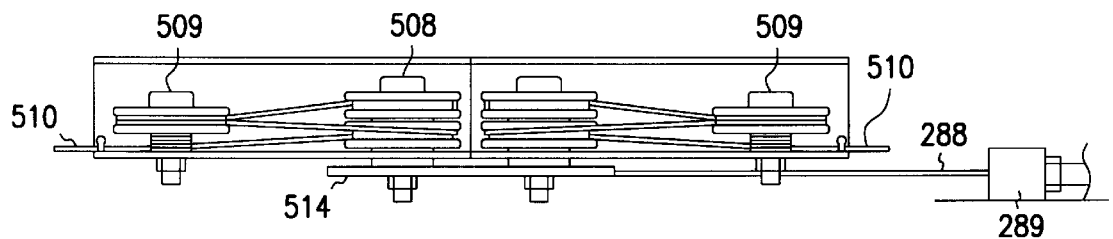
FIG. 7 is a front elevational view of the chute rotator mechanism of FIG. 6.
Figure 6:
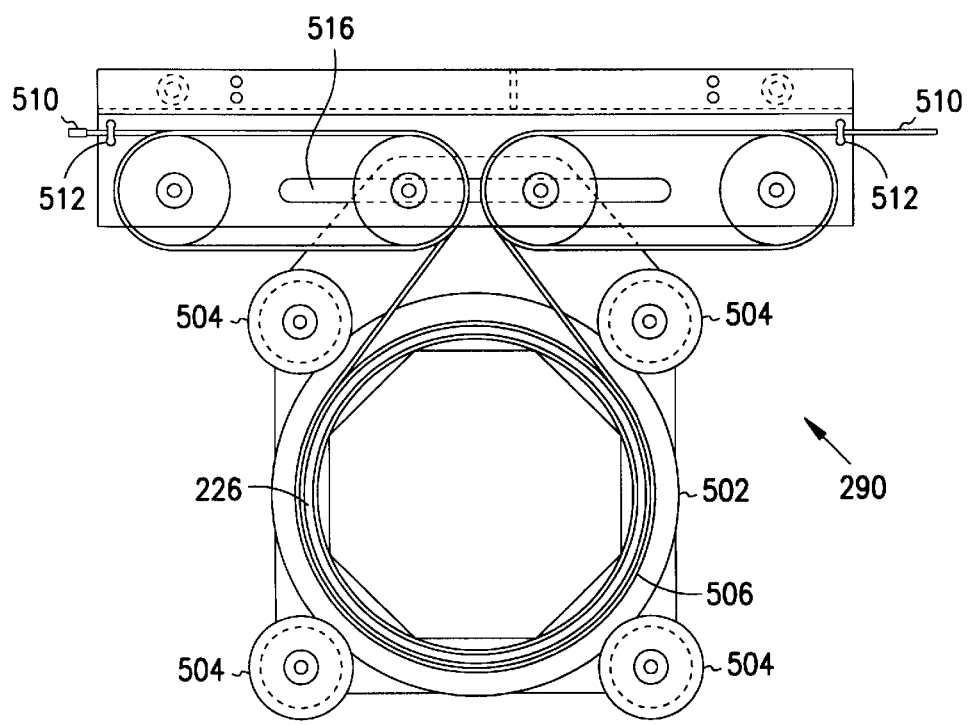
FIG. 6 is a top plan view of a chute rotator mechanism in accordance with one embodiment of the invention.

The chute rotator mechanism 290 is shown in detail in FIGS. 6–7. The chute 226 has a lip 502 which rides in a groove (not shown) of four rollers 504. Surrounding the chute is a rope cable 506. The rope cable 506 passes through a movable pulley system consisting of a series of inner pulleys 508 and a fixed pulley system consisting of a series of outer pulleys 509. The cable is retained at its ends 510 by clamps 512. The clamps 512 hold the cable 506 so that it is taut. The inner pulleys 508 are mounted to a sliding member 514 which is adapted to slide within a slot 516. Displacing motion is imparted to the sliding member 514 by the push-pull cable 288 which is anchored to a cable anchor 289. As the sliding member 514 moves, the position of the inner pulleys 508 is changed with respect to the outer pulleys 509. The movement of the inner pulleys 508 in conjunction with the frictional engagement of the cable 506 with the chute 226 effectively rotates the latter. While the present invention contemplates other chute rotation mechanisms, the embodiment described herein provides for approximately 200 degrees of chute rotation with only five inches of chute lever 286 (see FIG. 2) throw.

Figure 8:
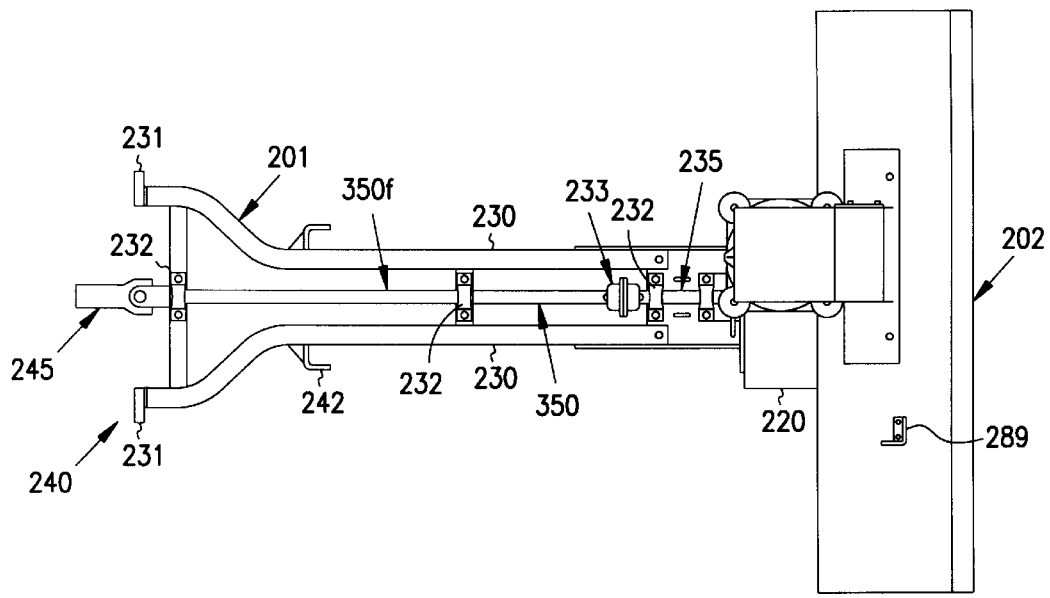
FIG. 8 is top plan view of the snowblower of FIG. 5 as attached to an implement frame assembly in accordance with one embodiment of the invention.
Figure 9:
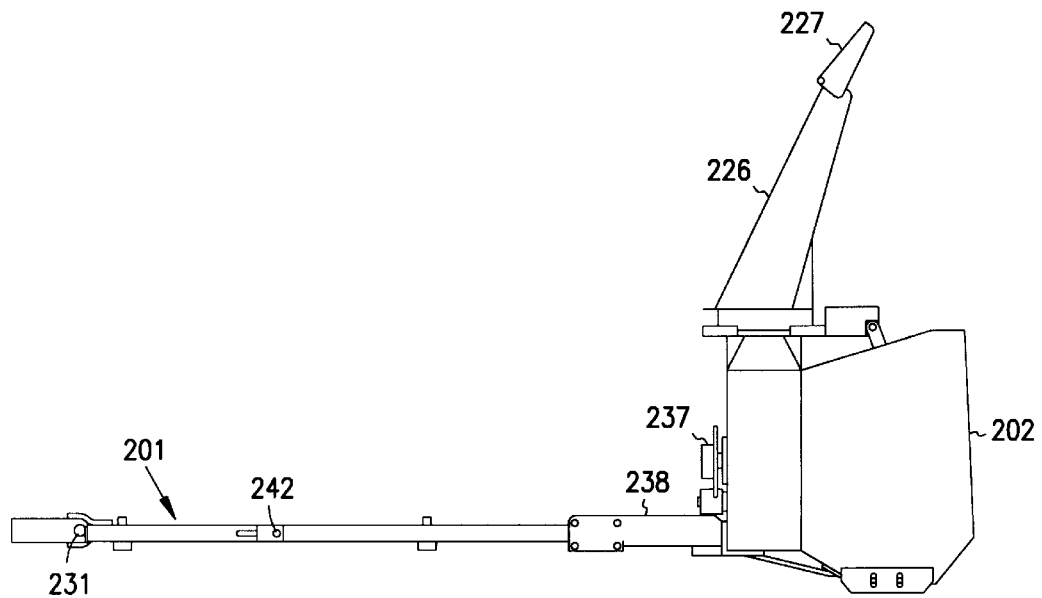
FIG. 9 is a side elevational view of the snowblower and implement frame assembly of FIG. 8.
Figure 10:
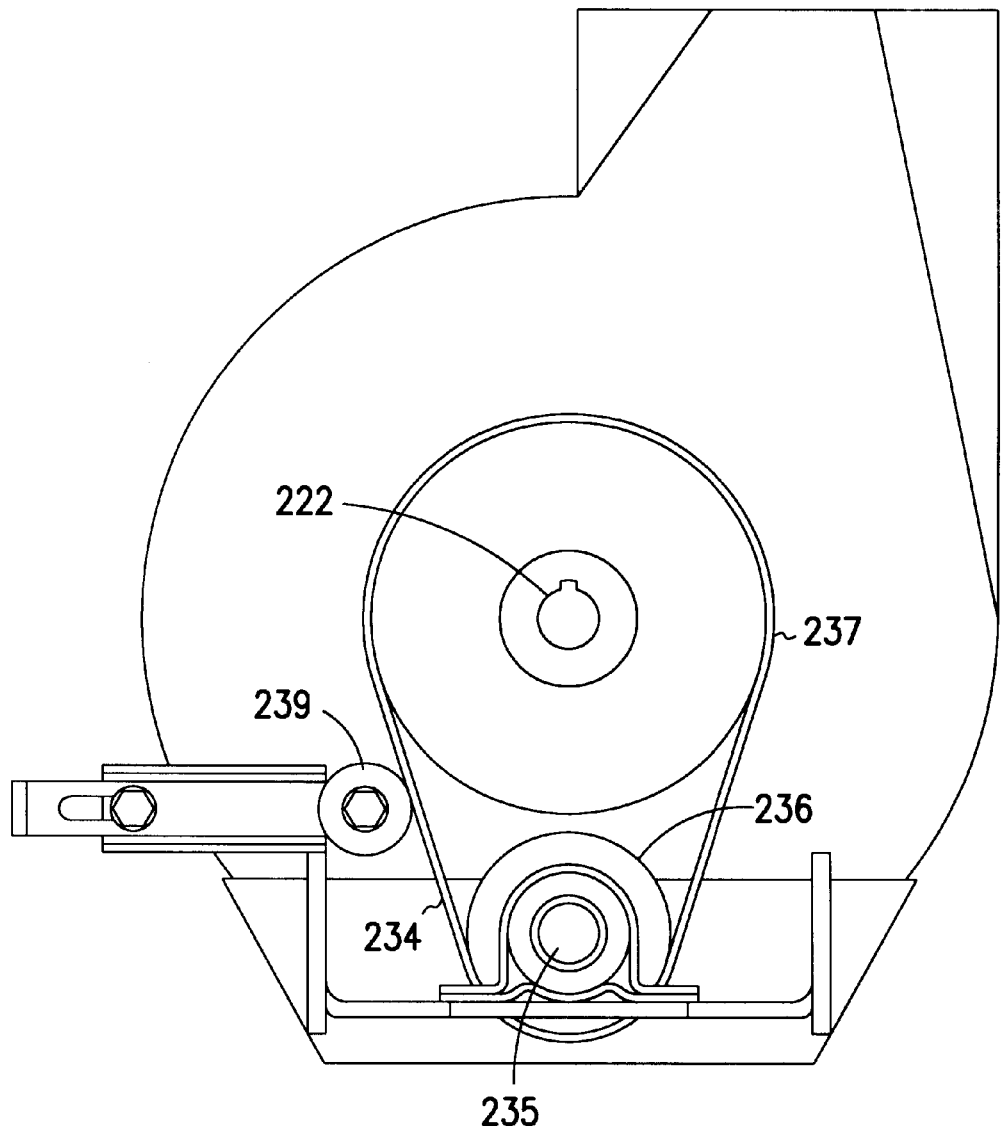
FIG. 10 is a rear elevational view of the snowblower of FIG. 5.

Having described one embodiment of the snowblower 202, attention will now be focused on an exemplary embodiment of the implement frame assembly 201 with reference to FIGS. 8–10. The implement frame assembly 201 comprises two rearwardly extending implement support tubes 230 which pivotally connect to the engine frame assembly 301 at a pivot member 231. The various pivoting features discussed herein may utilize conventional pivot bushings and hardware. The implement frame assembly 201 further includes a series of bearings 232 supporting a front drive shaft 350f of the drive shaft assembly 350. The front drive shaft 350f terminates at a first or rear side at a coupling feature comprising a U-joint 245. Coupled to an opposite end of the front drive shaft 350f is a chain coupler 233 which connects the front drive shaft 350f to a jack shaft 235. During operation, the jack shaft 235 transmits power to a drive sprocket 236 as shown in FIG. 10. The drive sprocket 236 is connected to an impeller/auger driven sprocket 237 by a chain 234. A chain tightener 239 may be used to maintain chain tension. The sprocket 237 is coupled to the impeller/auger drive shaft 222. Accordingly, power is effectively transferred from the front drive shaft 350f to the impeller 218 and the auger 214. While described herein with respect to a specific drive shaft assembly, other drive systems that are equally capable of transferring power from the engine to the snowblower are within the scope of the invention.

Referring now to FIGS. 8–9, the implement frame assembly 201 further includes a bracket 238 coupling the snowblower 202 to the implement frame assembly 201. At an opposite or rearmost end 240 of the frame 201, the support tubes 230 transition outwardly to better mate with the engine frame assembly 301 at the pivot member 231. Located forward of the end 240 are caster pivot joints 242. The caster pivot joints 242 are designed to pivotally support the caster frame assembly 250.

Figure 11:
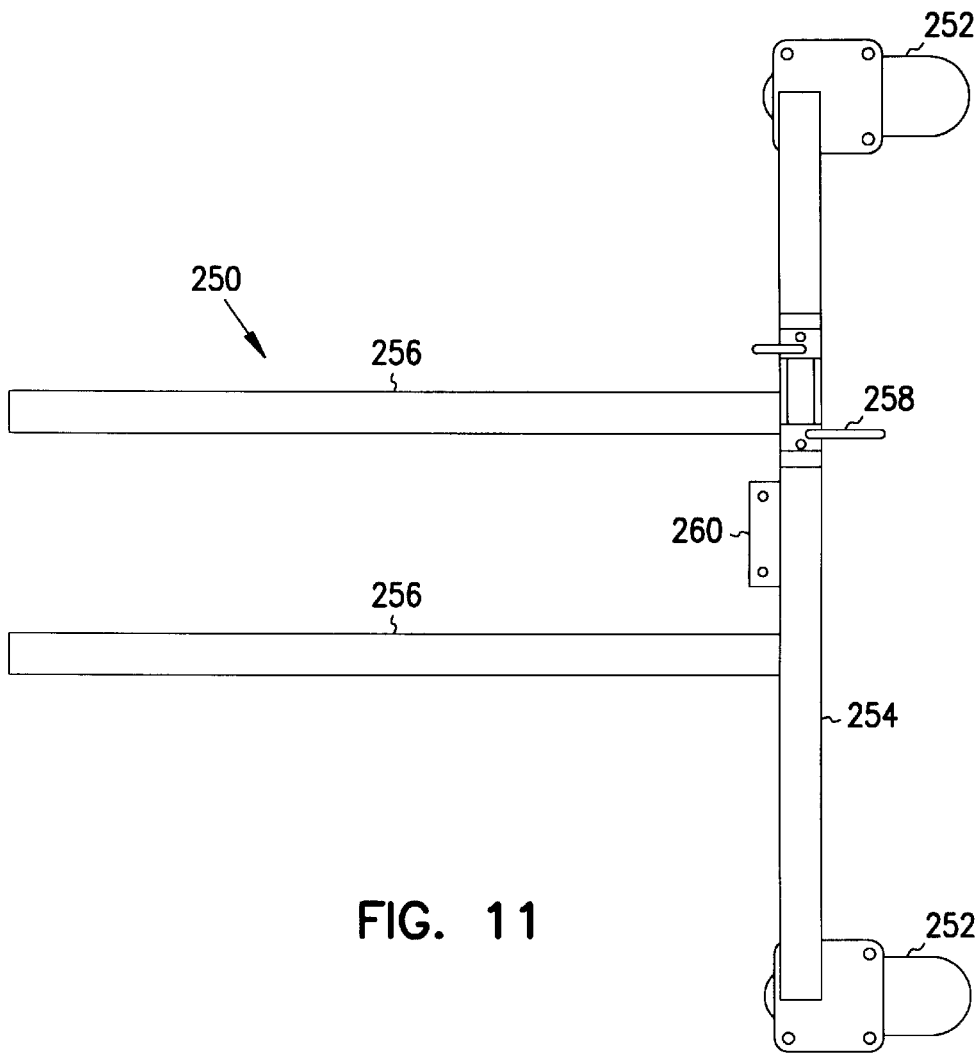
FIG. 11 is a top plan view of the caster frame assembly.
Figure 12:
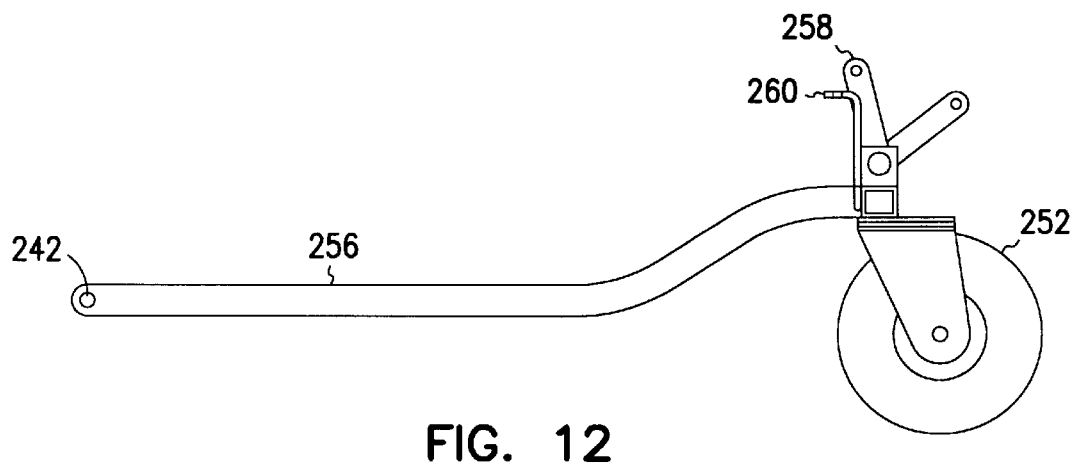
FIG. 12 is an side elevational view of the caster frame assembly of FIG. 11.

Referring now to FIGS. 11–12, the caster frame assembly 250, in one embodiment, comprises a lateral beam 254 spanning between two ground-engaging support members 252. While described herein as caster wheels 252, the ground-engaging support members may take various forms including, for instance, skis. Two substantially parallel caster support tubes 256 extend rearwardly from the lateral beam 254 and terminate at the caster pivot joint 242 (see FIGS. 3 and 4). When the snowblower 202 is in a ground-engaging position, the support tubes 256 are substantially parallel to the implement frame assembly support tubes 230. The caster frame assembly 250 is clearly shown as attached to the implement frame assembly 201 in FIGS. 3 and 4.

Figure 13:
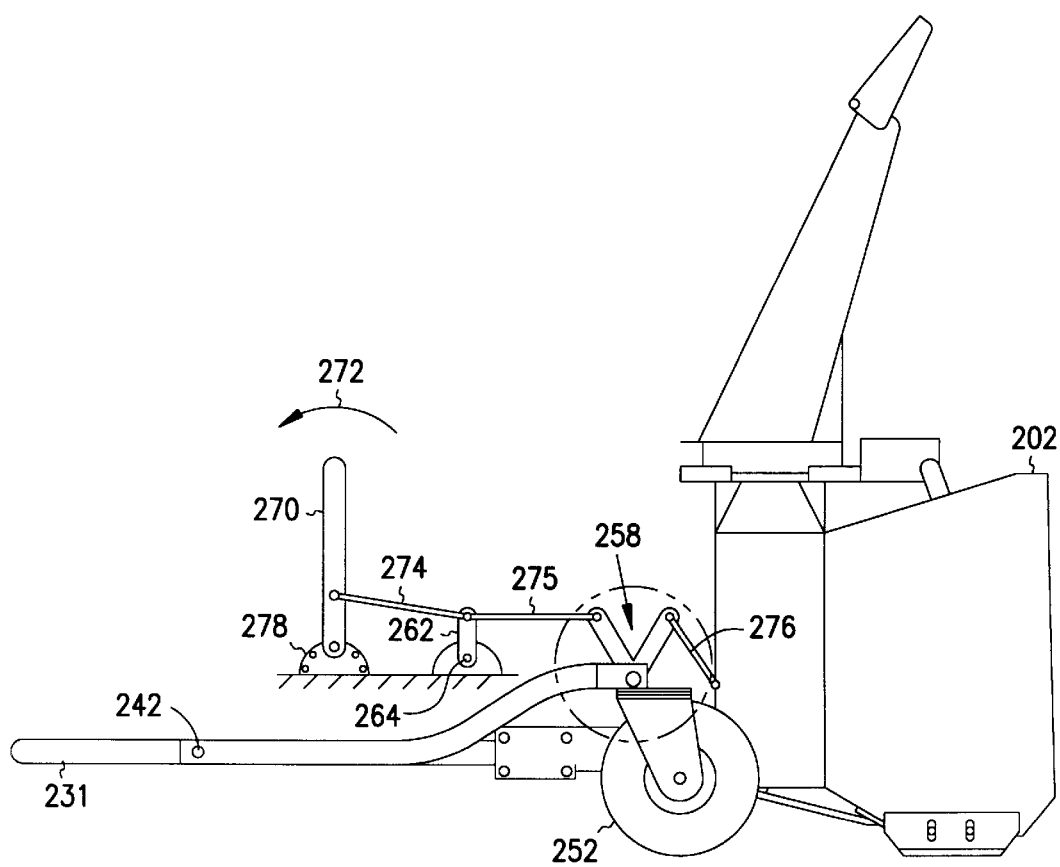
FIG. 13 is a partial side elevational view of an implement lift mechanism in accordance with one embodiment of the invention.
Figure 14:
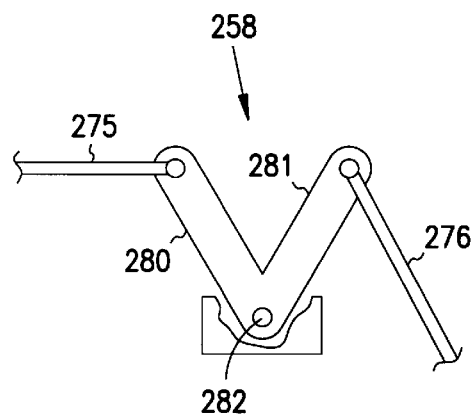
FIG. 14 is an enlarged partial view of the lifting mechanism of FIG. 13.

Referring now to FIGS. 13 and 14, the caster frame assembly 250 also includes a bellcrank 258. The bellcrank 258 is used to selectively raise and lower the snowblower 202. In one embodiment, the snowblower 202 is raised with the assistance of a control lever 270 also shown in FIGS. 2 and 13. The lever 270 pivots about a pivot fixture 278 fixed to the vehicle 102. Also attached to the lever 270 is a first tension member 274 which connects at an opposite end to an intermediate lever arm 262 which, in turn, is pivotally connected to the vehicle frame at a pivot 264. Also connected to the lever arm 262 is a second tension member 275 which connects to a first lever arm 280 of the bellcrank 258 (see FIG. 14). The bellcrank 258 is pivotable about a joint 282. As the bellcrank 258 pivots, a second lever arm 281 fixed to the first lever arm 280 rotates accordingly. As the second lever arm 281 rotates, it pulls a third tension member 276 connected to the snowblower 202 (see FIG. 13). Thus, by rotating the lever 270 in a first direction 272, the bellcrank 258 imparts a lifting force to the snowblower 202, lifting it from a first operating position to a second, raised or transportation position. The tension members 274, 275, and 276 may have various constructions comprising, for example, a cable or tie rod. The lever 270 and pivot fixture 278 are, in one embodiment, part of the blade option lift kit sold by Polaris Industries under its part number 2871736.

Other lifting configurations and mechanism may also be used without departing from the scope of the invention. For example, the intermediate lever arm 262 may be bypassed wherein the tension member 274 is connected directly to the bellcrank 258. Or alternatively, a pneumatic or hydraulic mechanism may be used to lift the snowblower. Those skilled in the art will realize that other mechanisms may also be used to achieve the required lifting motion.

To accommodate the lifting of the snowblower 202, the implement frame assembly 201 can pivot about a pivot axis formed by the pivot member 231. As the implement frame assembly 201 is raised, the caster frame assembly 250 pivots about the implement frame assembly at the pivot joint 242. As such, the caster wheels 252 remain in contact with the ground as the snowblower 202 is lifted. As the snowblower is raised, the caster wheels 252 and caster frame assembly 250 support the weight of the snowblower 202. To keep the snowblower elevated, the pivot fixture 278 includes a detent feature (not shown) that permits the lever 270 to be locked in various positions. To further assist in lifting and supporting the snowblower, a spring assist attach plate 260 (shown in FIGS. 11–12) located on the lateral beam 254 may operatively supports the snowblower 202 with one or more biasing members or springs 260 as shown in FIGS. 1–2.

Having described the front frame assembly 200, the rear frame assembly 300 will now be discussed. Referring once again to FIGS. 1–4, the rear frame assembly comprises the engine frame assembly 301 and the engine 302. In the exemplary embodiments described herein, the engine 302 is described with reference to the back end of the vehicle 102 and the implement 202 with the front end. However, embodiments where the components are reversed (i.e., the snowblower is mounted to the rear of the vehicle and the engine is mounted to the front) are also possible within the scope of the invention.

Referring to FIGS. 15 and 16, the rear frame assembly 300 is shown in detail. The engine 302 is secured to a platform 303 and may be surrounded by one or more guards 304. In one embodiment, the engine 302 is generally of the type represented by the twelve horsepower "Snow King" manufactured by the Tecumseh Products Company. However, those skilled in the art will realize that other power sources including other internal combustion engines may be used without departing from the scope of the invention.

Extending forwardly from the engine 302 are the engine frame support tubes 306. The support tubes are spanned by a crossbeam supporting a drive shaft support bearing 308 toward the front end of the engine frame assembly 301. At the forward-most point of the engine frame assembly 301 is a forward attachment mechanism 310 shown more clearly in FIG. 18. The engine frame assembly 301 also includes a rear attach point 312. In one embodiment, the rear attach point connects to the trailer hitch of the vehicle 102 with a conventional fastener (not shown).

Figure 17:
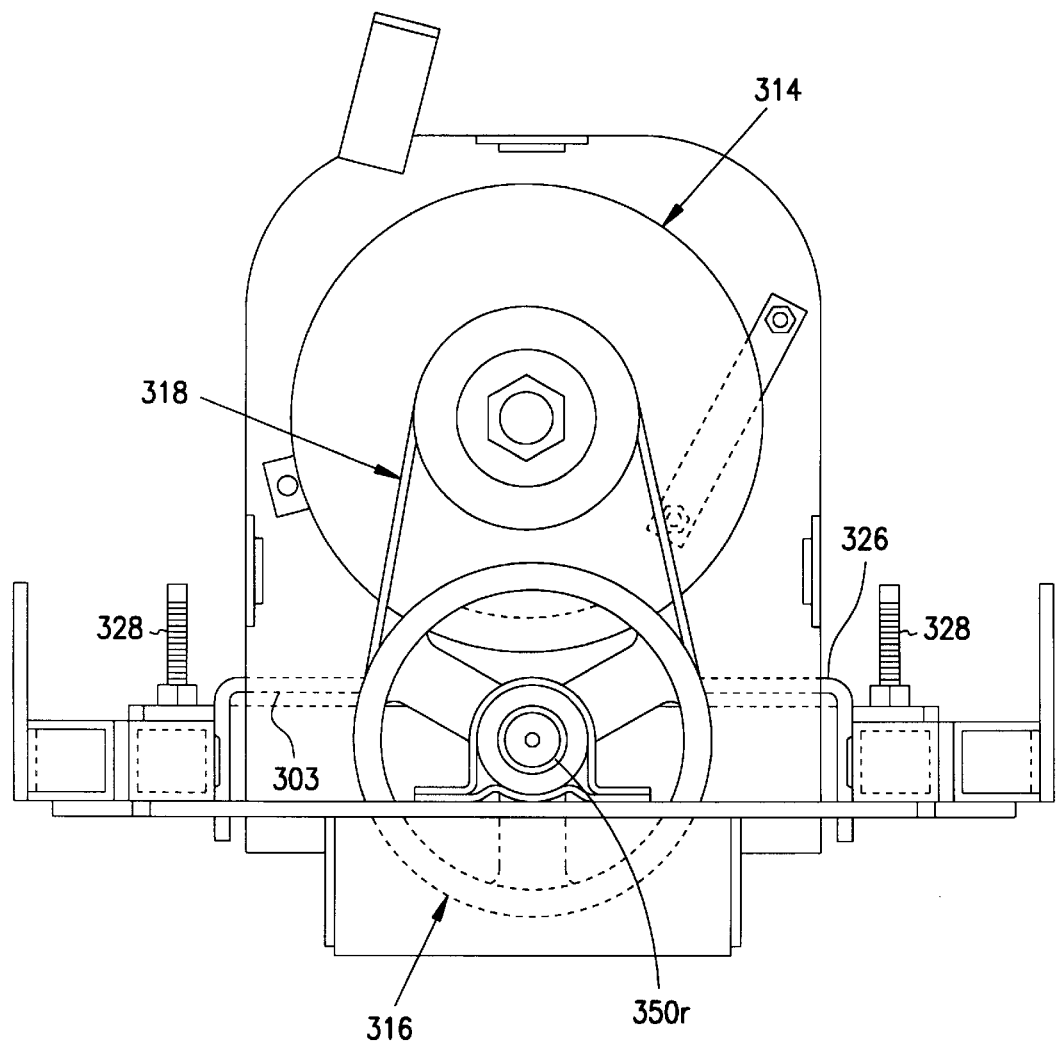
FIG. 17 is a front elevational view of the rear frame assembly of FIG. 15.

Referring now to FIG. 17, the forward side of the engine 302 is shown. The engine includes a crankshaft (not shown) which powers a driven clutch assembly 314. The clutch assembly 314 is coupled to a pulley 316 by a drive member or belt 318. The pulley 316 is operatively connected to a rear drive shaft 350r. The platform 303 may also include an adjustable engine mount 326. By manipulation of a series of threaded rods 328, the engine mount 326 may be raised or lowered, thus tightening (or loosening) the belt 318.

Referring to FIG. 15, a forward end 324 of the rear drive shaft 350r is adapted to be received within the U-joint 245 as shown in FIG. 3. To adequately transmit torque from the rear drive shaft 350r to the front drive shaft 350f, the forward end 324 may include a male engaging profile that engages a female engaging profile within the U-joint 245. For example, the end 324 may be splined. Alternatively, the end 324 may have a series of flat portions (e.g., hexagon shaped) designed to be received within the female profile of the U-joint 245. Other profiles are also possible. Alternatively, the rear drive shaft 350r could incorporate the U-joint and receive therein a mating portion of the front drive shaft 350f. Thus, the exact coupling of the drive shafts is not critical. By placing a U-joint between the front and rear drive shafts 350f, 350r, any misalignment between the drive shafts may be accommodated. Furthermore, the U-joint 245 permits pivoting of forward frame assembly 200 about the pivot feature 231.

Figure 18:
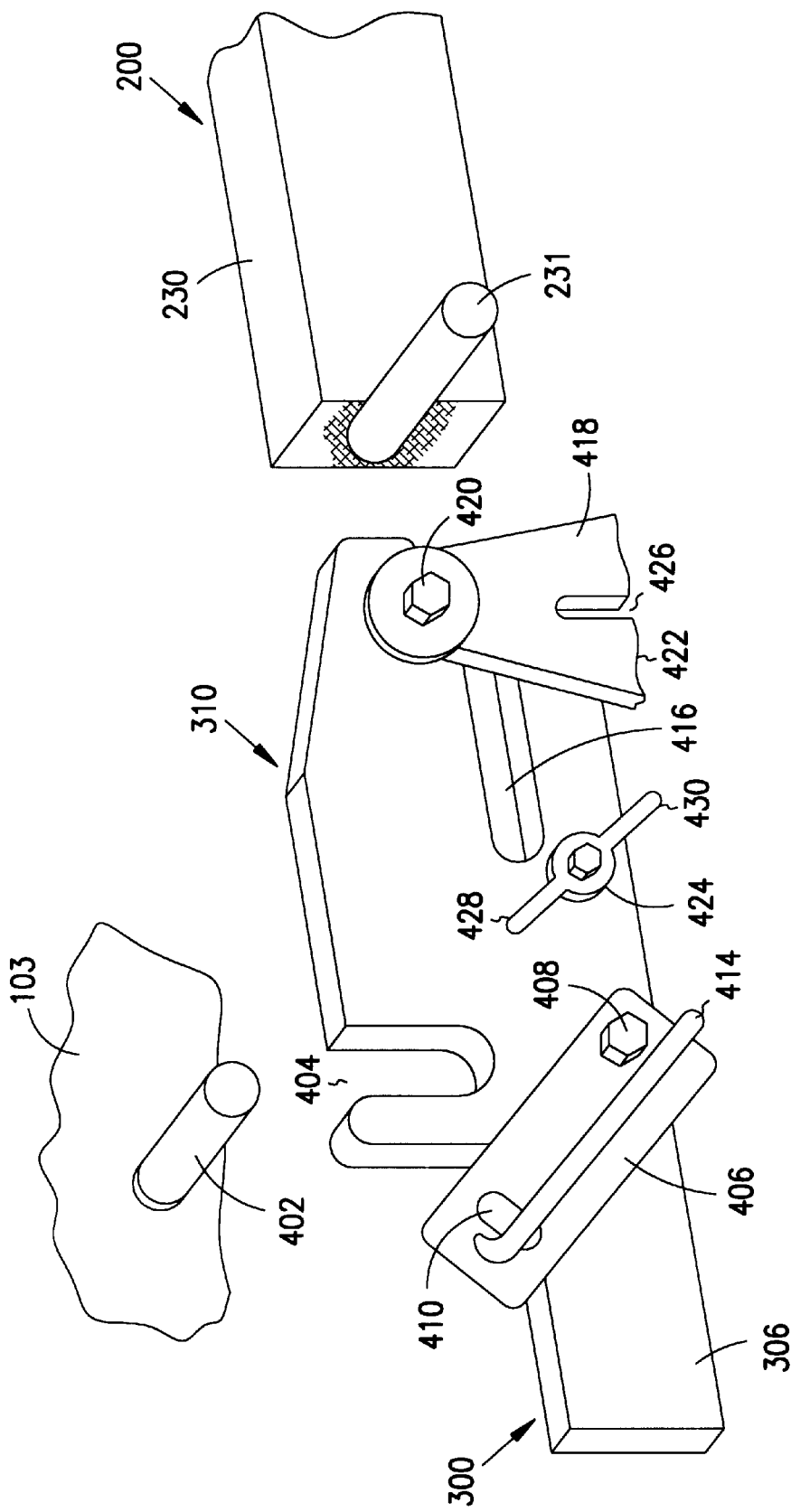
FIG. 18 is a perspective view of an attachment mechanism in accordance with one embodiment of the present invention.
Figure 19:
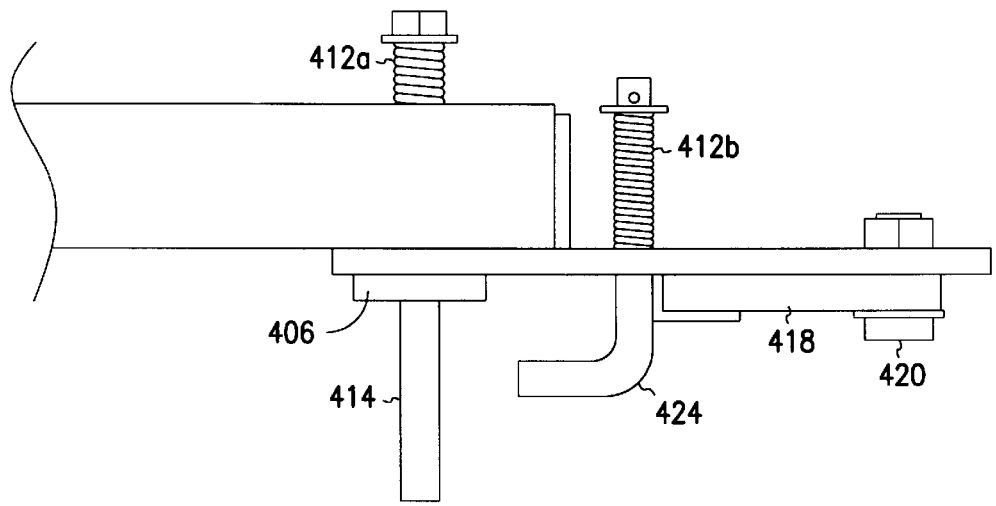
FIG. 19 is a top plan view of the attachment mechanism of FIG. 18.

Referring now to FIG. 18, the forward attachment mechanism 310 will be described. The attachment mechanism 310 permits the rear frame assembly 300 to be coupled to the ATV 102 and the forward frame assembly 200 to be pivotally coupled to the rear frame assembly. The undercarriage structure 103 of the ATV 102 comprises a support member or peg 402 extending outwardly from each side. A slot 404 on the mechanism 310 is adapted to receive the support peg 402. To secure the rear frame assembly to the undercarriage structure 103, a spring loaded lock plate 406 is pivoted about a first pivot joint 408 until a hole 410 in the lock plate engages the peg 402. The lock plate 406 is spring loaded on the opposite side by a compression spring 412a as shown in FIG. 19. The lock plate 406 is spring loaded from the back side such that it may be pulled away from the mechanism 310 sufficiently to permit the hole 410 to engage the peg 402. A handle 414 allows the operator to better manipulate the lock plate.

In one embodiment, the member 402 is part of the blade option frame kit sold by Polaris under its part number 2871736. However, the member 402 may be incorporated into another structure which is removable or permanently mounted to the undercarriage structure 103.

Figure 20:
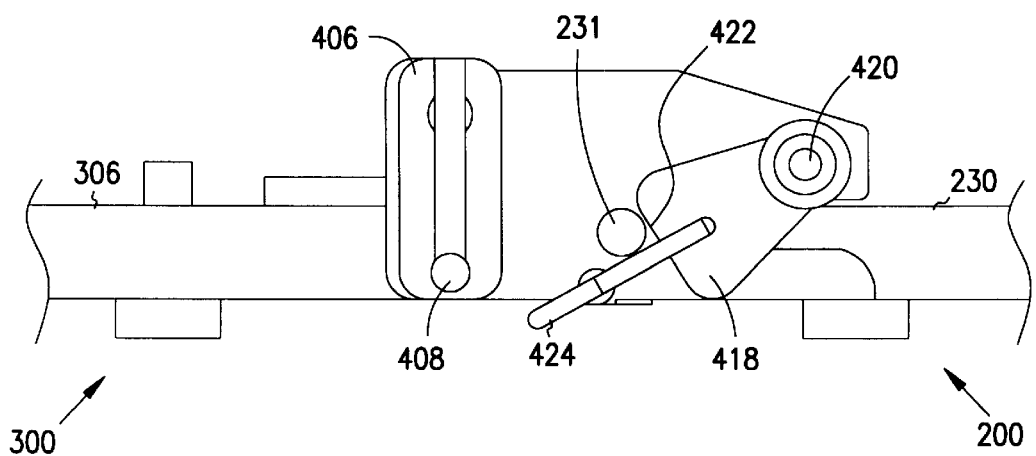
FIG. 20 is a side elevational view of the attachment mechanism of FIG. 18.

Also located on the mechanism 310 is a slot 416 and a locking pawl 418. The pawl 418 is pivotable about a pawl pivot 420. The slot 416 is adapted to receive the pivot member 231 of the front frame assembly 200. Once the pivot member 231 is sufficiently received within the slot 416, the pawl 418 is rotated counterclockwise (as shown in FIG. 18) until a camming surface 422 engages the pivot member 231. A pawl lock pin 424 may then be used to retain the pawl 418 and thus secure the forward frame assembly 200 to the rear frame assembly 300. The pawl lock pin 424 is pivotable and spring loaded from the back side by a spring 412b (see FIG. 19) such that the pin 424 may be pulled away from the mechanism 310 a sufficient distance to permit a tab portion 428 to engage a slot portion 426 of the pawl 418 as shown in FIG. 20. The lock pin 424 may also include a handle 430.

Accordingly, the forward attachment mechanism 310, in conjunction with the rear attach point 312, permits quick and simple attachment of the implement apparatus 101 to the ATV 102. While described herein with respect to specific exemplary embodiments, other attachment devices and methods may also be used without departing from the scope of the invention. That is, the attachment mechanism 310 described herein is illustrative only.

Having described the structure of the implement apparatus 101, attention will now be focused on the control features of the present invention. The lifting mechanism, discussed above, permits raising and lowering of the snowblower 202 by operator manipulation of the lever 270 as shown in FIGS. 2 and 13. In addition to lifting of the snowblower, other control features may also be included. For example, the chute lever 286 shown in FIG. 2 and discussed herein may be included to permit the operator to rotate the discharge chute 226 as desired.

Still referring to FIG. 2, a clutch lever 292 may be pivotally mounted to the ATV 102. The clutch lever 292 is connected by a cable 294 to the clutch assembly 314 of the engine 302. By selective engagement of the clutch lever 292, the clutch assembly 314 may be engaged, thereby supplying power through the drive shaft assembly 350 to the snowblower 202.

Other controls are also possible within the scope of the invention. For example, a nozzle control (not shown) may be included to allow adjustment of the nozzle 227. Additionally, a throttle control (also not shown) may be included to permit throttling of the engine 302. Other controls are also possible within the scope of the invention.

Having described exemplary embodiments of the controls, attention will now be focused on the operation and installation of the modular snowblowing attachment 101. In its dis-assembled state, the implement apparatus 101 is separated into the rear frame assembly 300 and the forward frame assembly 200. With the two assemblies separated, the ATV operator may place the ATV 102 over the rear frame assembly 300. This may be accomplished by manually sliding the assembly 300 under the rear of the ATV 102 or, alternatively, the ATV 102 may be backed over the assembly. The rear frame assembly 300 may then be attached to the rear attach point 312 (see FIG. 16). The operator may then attach the forward portion of the rear frame assembly 300 to the undercarriage structure 103 by engaging the forward attach mechanism 310 with the support member 402 as described above.

With the rear frame assembly 300 attached, the vehicle 102 may be driven over the forward frame assembly 200 (or, alternatively, the forward frame assembly may be slide underneath the front of the ATV). The rear end of the forward frame assembly 200 may be connected by first coupling the U-joint 245 (see FIG. 8) to the end 324 of the rear drive shaft 350r (see FIG. 15). Once the drive shaft is secured, the pawl 418 of the forward attachment mechanism 310 may be manipulated to securely retain the pivot member 231 as described above. Accordingly, the implement apparatus 101 is secured to the vehicle 102.

Once the frame assemblies are attached, the operator may attach and connect the various control features including the lift lever 270, the chute rotator lever 286 and the clutch lever 292. The control levers may remain attached to the ATV 102 wherein the connecting components (e.g., cables, tie rods) are connected each time the apparatus 101 is installed. Alternatively, the control levers may be disconnected and removed with the apparatus.

Once the implement apparatus 101 is completely installed, the snow removal machine 100 is ready for operation. By pulling the lift lever 270 toward the operator (see FIG. 2), the snowblower 202 may be placed in the raised or transport position. The operator is then free to drive the machine 100 to various locations in need of snow removal. Since the wheels 252 are castering, the machine 100 remains steerable at all times. Upon arrival at a site in need of snow removal, the operator may shut down the ATV, set the parking brake, and dismount the vehicle. After ensuring that the clutch is disengaged, the operator may then proceed to start the engine 302. In one embodiment the engine has a conventional pull-start. However, other start mechanisms including electric start are also possible within the scope of the invention. Once started, the operator may return to the ATV 102 and start the prime mover 106. The snowblower 202 may be placed in the down or operating position as shown in FIG. 2 by manipulation of the lever 270 as described above. Once the snowblower 202 is correctly positioned, the operator may adjust the chute 226 direction by manipulation of the handle 286 as described above. Finally, the snowblower 202 may be activated by engaging the clutch 314 with the clutch lever 292. Once engaged, the clutch transmits power from the engine 302 through the drive shaft assembly 350 to the impeller 218 and the auger 214. At this point, the snowblower may begin clearing snow. By propelling the machine 100 in the forward direction under the drive power of the vehicle 102, the snowblower can clear a path equal to its width. Depending on the depth and compaction of the snow, the operator may make frequent adjustments to the chute 226 and nozzle 227 direction as well as to the vehicle speed and snowblower throttle. When completed, the operator may disengage the clutch 314 and optionally throttle down the engine 302. The snowblower 202 can then be returned to the raised position where the machine 100 can be transported to the next site.

Figure 21:
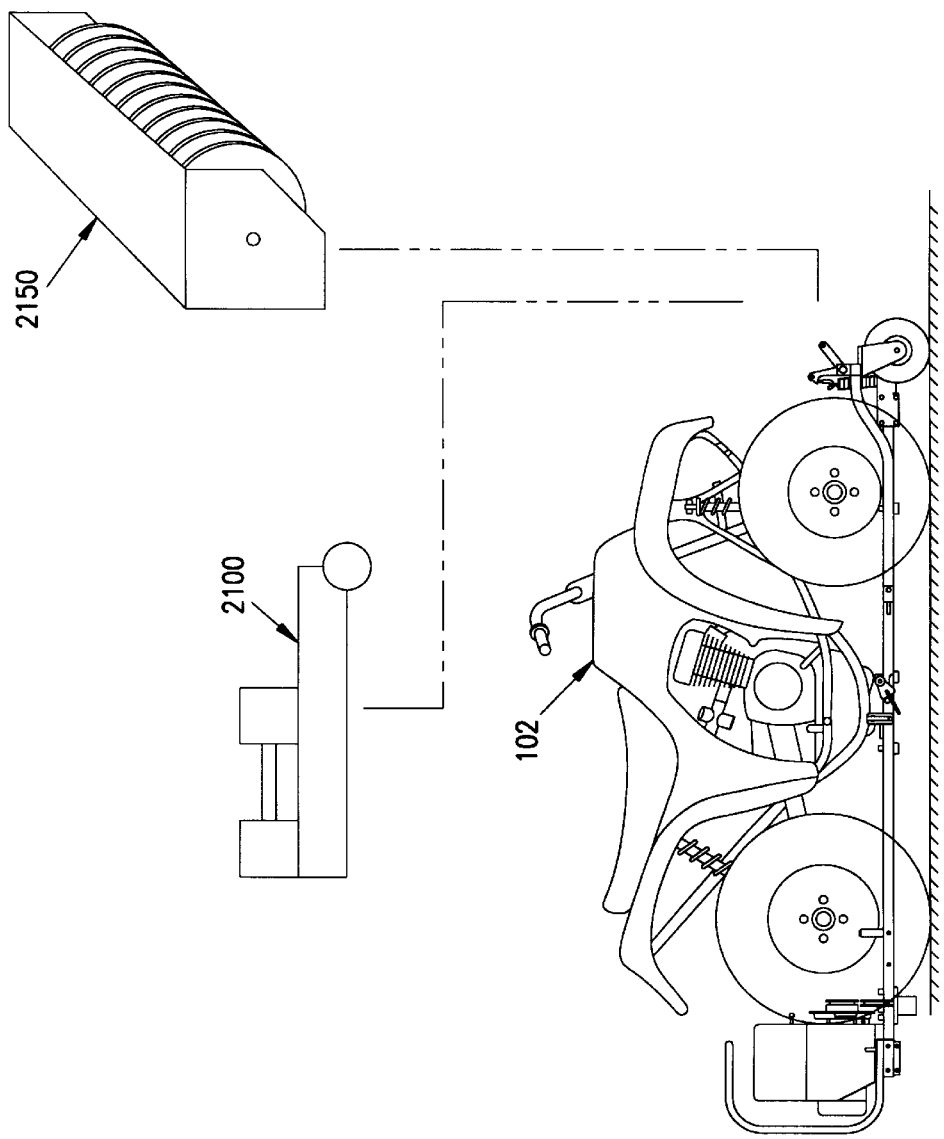
FIG. 21 is a side elevational view of alternative attachments in accordance with the present invention.

While described herein with reference to specific embodiments, other embodiments are also possible within the scope of the invention. For example, the apparatus 101 may be modified to attach to other vehicles besides ATVs. In addition, other implements besides snowblowers may be used in conjunction with the present invention. For example, FIG. 21 shows a mower 2100 and a horizontal axis rotary sweeper or broom 2150 that may be installed in place of the snowblower 202. Other powered implements (e.g., leaf blower) may also be used without departing from the scope of the invention.

Advantageously, the implement apparatus of the present invention provides a self-powered, modular snowblower attachment for use with ATVs and the like. Because the apparatus includes a power source, no power connection to the ATV is necessary. In addition, vehicle stability is minimally impacted due to the placement of the implement one a first side of the vehicle and the placement of the engine on a second opposing side. Furthermore, the incorporation of the caster frame assembly 250 supports the implement in a raised position without adversely impacting the weight distribution of the vehicle. This allows transportation of the vehicle from one site to another without having to remove the apparatus.

Preferred embodiments of the present invention are described above. Those skilled in the art will recognize that many embodiments are possible within the scope of the invention. Variations, modifications, and combinations of the various parts and assemblies can certainly be made and still fall within the scope of the invention. Thus, the invention is limited only by the appended claims, and equivalents thereto.

What is claimed is:

1. An apparatus for attaching a motorized implement to a traction vehicle, comprising:
   a longitudinal frame assembly connected to the traction vehicle, the longitudinal frame assembly having a first portion and a second portion, the first portion extending generally beyond a first end of the vehicle and the second portion extending beyond a second end of the vehicle, the first portion adapted to support the implement;
   at least one ground-engaging support member attached to the longitudinal frame assembly;
   an auxiliary power source secured to the second portion of the longitudinal frame assembly;
   a drive shaft assembly operatively connected to the auxiliary power source at an input end and adapted to connect to the implement at an output end;
   an implement frame assembly having a first end pivotally connected to the second portion of the longitudinal frame assembly at a first pivot joint and a second end adapted to couple to the ground-engaging implement; and
   a caster frame assembly having a first end pivotally connected to the implement frame assembly at a second pivot joint and a second end supported by the at least one ground-engaging support member.

2. The apparatus of claim 1 wherein the auxiliary power source is an internal combustion engine.

3. An apparatus for attaching a motorized, ground-engaging implement to a traction vehicle, comprising:
   an engine frame assembly coupled to the vehicle and extending outwardly from a first end of the vehicle, the engine frame assembly forming an engine mount;
   an implement frame assembly pivotally connected to the engine frame assembly at a first pivot joint, the implement frame assembly extending outwardly from a second end of the vehicle and adapted to support the ground-engaging implement; and
   a caster frame assembly pivotally connected to the implement frame assembly at a second pivot joint;
   an internal combustion engine assembly secured to the engine mount; and
   a drive shaft assembly operatively connected to the internal combustion engine at an input end and adapted to connect to the ground-engaging implement at an output end.

4. The apparatus of claim 3 wherein the caster frame assembly further comprises a pair of ground-engaging support members.

5. The apparatus of claim 4 wherein the ground-engaging support members are caster wheels.

6. The apparatus of claim 3 further comprising a lift mechanism adapted to raise the ground-engaging implement from a first, ground-engaging position to a second, raised position.

7. A self-powered apparatus for attachment to a traction vehicle, the vehicle having an undercarriage structure, the apparatus comprising:
   a powered, ground-engaging implement;
   an engine frame assembly coupled to the vehicle and extending outwardly from a first end of the vehicle, the engine frame assembly forming an engine mount;
   an implement frame assembly pivotally connected to the engine frame assembly at a first pivot joint, the implement frame assembly extending outwardly from a second end of the vehicle to support the ground-engaging implement;
   a caster frame assembly pivotally connected to the implement frame assembly at a second pivot joint;
   an internal combustion engine assembly secured to the engine mount; and
   a drive shaft assembly operatively connecting the internal combustion engine to the ground-engaging implement.

8. The apparatus of claim 7 wherein the engine frame assembly connects to an undercarriage structure of the vehicle at a first attach point proximal the engine mount and at a second attach point on the undercarriage structure of the vehicle.

9. The apparatus of claim 8 wherein the engine frame assembly further comprises one or more engine support tubes, each engine support tube having a connection mechanism for securing the engine frame assembly to the second attach point and wherein the connection mechanism incorporates the first pivot joint.

10. The apparatus of claim 9 wherein the implement frame assembly further comprises one or more implement support tubes, each implement support tube extending from the first pivot joint to the ground-engaging implement.

11. The apparatus of claim 7 wherein the caster frame assembly further comprises:
    a lateral beam proximal the ground-engaging implement, the lateral beam supporting a pair of ground-engaging, castering support members; and
    one or more caster support tubes, the caster support tubes extending from the lateral beam to the second pivot joint.

12. The apparatus of claim 7 further comprising a lift mechanism whereby the ground-engaging implement may be raised from a first, ground-engaging position to a second, raised position.

13. The apparatus of claim 12 wherein the lift mechanism comprises:
    a bellcrank pivotally attached to the caster frame assembly, the bellcrank having a first lever arm and a second lever arm;
    a control lever operatively connected to the first lever arm; and a tension member operatively connected between the second lever arm and the ground-engaging implement wherein manipulation of the control lever imparts a lifting force to the implement, thereby pivoting the implement frame assembly about the first pivot joint and the caster frame assembly about the second pivot joint, thus translating the ground-engaging implement from the first, ground-engaging position to the second, raised position.

14. The apparatus of claim 7 wherein the internal combustion engine assembly further comprises:

a crankshaft;

a clutch assembly operatively connected to the crankshaft;

a pulley in fixed relation to the clutch assembly, wherein the pulley is coupled to the drive shaft assembly; and a drive member connected between the clutch assembly and the pulley to transfer rotational power therebetween.

15. The apparatus of claim 14 wherein the drive shaft assembly further comprises a rear drive shaft operatively secured to the engine frame assembly and a front drive shaft operatively secured to the implement frame assembly.

16. The apparatus of claim 15 wherein the front drive shaft and the rear drive shaft are removably coupled at a coupling feature.

17. The apparatus of claim 16 wherein the coupling feature comprises a U-joint.

18. The apparatus of claim 17 wherein the U-joint is proximal to the first pivot joint.

19. The apparatus of claim 7 wherein the ground-engaging implement is a snowblower.

20. The apparatus of claim 7 wherein the ground-engaging implement is a mower.

21. The apparatus of claim 7 wherein the ground-engaging implement is a rotary sweeper.

22. The apparatus of claim 19 wherein the snowblower comprises a rotatable discharge chute.

23. The apparatus of claim 22, wherein the discharge chute comprises a chute rotator mechanism to remotely rotate the chute.

24. The apparatus of claim 23, wherein the chute rotator mechanism comprises:

a fixed pulley system, the fixed pulley system being fixed relative to the discharge chute;

a movable pulley system, the movable pulley system attached to a sliding member for motion relative to the fixed pulley system;

a rope cable operatively engaged with the discharge chute and the two pulley systems; and a control cable connected to the sliding member, the control cable adapted to displace the sliding member and the movable pulley system causing the rope cable to be displaced in a manner which rotates the discharge chute.

25. A snow removal machine comprising:

an all terrain vehicle, comprising:

a frame;

a vehicle engine supported by the frame;

one or more drive wheels coupled to the vehicle engine; and one or more steerable wheels adapted to steer the vehicle; and a self-powered snowblowing apparatus for attachment to the frame, the apparatus comprising:

a snowblowing implement;

an engine frame assembly coupled to the vehicle and extending outwardly from a first end of the vehicle, the engine frame assembly forming an engine mount;

an implement frame assembly pivotally connected to the engine frame assembly at a first pivot joint, the implement frame assembly extending outwardly from a second end of the vehicle to support the snowblowing implement; and a caster frame assembly pivotally connected to the implement frame assembly at a second pivot joint;

an internal combustion engine assembly secured to the engine mount; and a drive shaft assembly operatively connecting the internal combustion engine to the snowblowing implement.

* * * * *